United States Patent
Daniels et al.

[11] 3,821,175
[45] June 28, 1974

[54] STABLE AQUEOUS EMULSIONS OF VINYL ETHER/ACRYLATE/N-ALKYLOL ACRYLAMIDE TERPOLYMERS AND TREATMENT OF TEXTILES THEREWITH

[75] Inventors: Wiley Edgar Daniels, Easton, Pa.; John Julian Duncan, Chatanooga, Tenn.

[73] Assignee: GAF Corporation, New York, N.Y.

[22] Filed: Dec. 29, 1971

[21] Appl. No.: 213,841

[52] U.S. Cl.. 260/80.73, 260/29.6 TA, 260/86.1 N, 8/116.2, 117/124 E, 117/132 B, 117/139.5 A, 117/145

[51] Int. Cl. .............................................. C08f 15/40

[58] Field of Search ................................ 260/80.73

[56] References Cited
UNITED STATES PATENTS

| | | | |
|---|---|---|---|
| 3,007,887 | 11/1961 | Essig | 8/116.3 |
| 3,012,911 | 12/1961 | Moser | 8/116.3 |
| 3,090,704 | 5/1963 | Collins et al. | 8/116.3 |
| 3,117,108 | 1/1964 | Calvete | 260/80.73 |
| 3,123,496 | 3/1964 | Schlacke et al. | 8/116.3 |
| 3,220,869 | 11/1965 | Ruemens et al. | 8/116.3 |
| 3,240,740 | 3/1966 | Knapp et al. | 8/116.3 |

*Primary Examiner*—Stanford M. Levin
*Attorney, Agent, or Firm*—Walter C. Kehm; Samson B. Leavitt

[57] ABSTRACT

A terpolymer structure comprising the following repeating units,

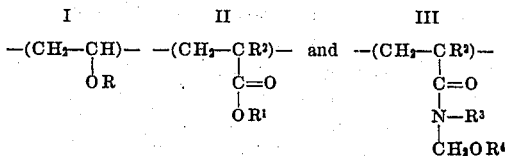

wherein R and $R^1$ are $C_1$–$C_{18}$ alkyl, $R^2$ is hydrogen or methyl, $R^3$ is hydrogen, $C_{1-18}$ alkyl, arylakyl, or aryl and $R^4$ is hydrogen, $C_{1-18}$ alkyl or cycloalkyl and wherein said structure contains approximately by weight 10 to 25 parts of unit I, 85 to 75 parts of unit II and 2 to 7 parts of unit III and a method of treating cellulosic fabric with a latex derived therefrom.

10 Claims, No Drawings

STABLE AQUEOUS EMULSIONS OF VINYL ETHER/ACRYLATE/N-ALKYLOL ACRYLAMIDE TERPOLYMERS AND TREATMENT OF TEXTILES THEREWITH

This invention relates to novel terpolymers of a vinyl ether, an unsaturated acrylate, and an N-alkylol acrylamide including interpolymers with other monomers and like monomers. More particularly, the invention relates to stable aqueous emulsions containing such terpolymers and interpolymers and to a use for same. Still more particularly the invention relates to terpolymers wherein the vinyl ether comonomer may be chosen from the group $CH_2$ CH—OR: where R, as in the acrylate having an $R^1$, is $C_{1-18}$ alkyl, and N-alkylol acrylamide from the group

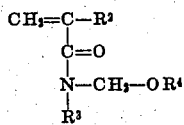

wherein $R^2$ stands for hydrogen or methyl, $R^3$ for hydrogen, $C_{1-18}$ alkyl, arylalkyl, aryl, $R^4$ for hydrogen, $C_{1-18}$ alkyl or cycloalkyl, such as, for example, methyl, ethyl, n-propyl, isopropyl, n-butyl, isobutyl and cyclohexyl.

Furthermore, R, $R^1$ and/or $R^4$ may be linear or branched, e.g., n-butyl vs. isobutyl. These monomers when polymerized result in a terpolymer structure comprising the following repeating units:

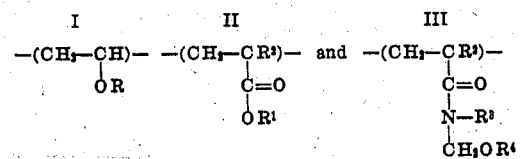

It is known that textiles having cellulosic fibers, alone or mixed with other natural or synthetic fibers can be treated with compounds such as copolymers of N-alkylolamides of an acrylic acid and one or more other polymerizable compounds to improve the crease resistance of the resultant fabric. The treated textile thus acquires various excellent properties, for example tear resistance, abrasion resistance, resistance to trichloroethylene and retention of textile character. It has been found in some cases, however, that the treated textiles tend to become irreversibly soiled during washing with hot aqueous liquids; the foregoing being known as wet soiling.

It has been found that the above identified novel composition of matter imparts unique properties to textile articles. For example, the use of the latices of the instant composition in textile treatment gives to the fabric improved properties and the like, over those now available with known poly(acrylate/N-methylol acrylamide) latices and the like.

Modified polyacrylate latices such as those in the prior art are widely used as fabric hand modifiers and as antiabrasion finishes for textile garments and articles treated with thermosetting resins of the wash-and-wear or durable press type. These latices, are to a certain extent, operative to modify a harshness imparted by the thermosetting resins and give the desired fabric a somewhat more pleasing hand, improved draping properties, and after washing and drying, enhanced smooth drying properties.

It has also been found that the latices of the instant copolymer substantially out preform the prior art latices in those areas as well as being useful as adhesives. They are also able to deposit clear films of good tack and strength which upon heating are substantially permanently bonded to a wide variety of substrates such as aluminum, mylar, paper, etc. The bonded films ordinarily cannot be removed by washing with water since they are chemically cross-linked to the alkylol groups. When these latices are used as adhesives, no particular surfactant requirements are noted, and a wide variety of surfactants may be used interchangeably.

Although typical commercial polyacrylate latices protect the cellulosic yarns from abrasive wear to a degree the vinyl ether/acrylate/N-alkylol acrylamide latices of the instant invention performs this function to a clearly superior degree as will be brought out hereinafter.

Many polyester/cotton textile garments are now treated with soil-release finishes which are applied in conjunction with durable press resins and common adjuvants. The soil-release finishes allow oil and water borne stains on the untreated fabrics to be removed more easily during the laundering of the garment and are needed to overcome the natural tendency of resin-treated polyester/cotton fabrics to retain soils, particularly oily soils. The common reactive acrylic latices, even with their desirable features have fallen into disfavor for use on fabrics containing soil-release finishes because the reactive polyacrylate finishes themselves have the property of being oil retentive and thus offset the properties of the soil-release finish. It has been found that the vinyl ether/acrylate/N-alkylol acrylamide terpolymer finish of the instant invention is noticeably less oil stain retentive than common polyacrylate finishes. This property allows for its use and possible acceptance where other types of latices might be unacceptable.

SUMMARY OF THE INVENTION

It is one of the objects of the present invention to provide a terpolymer of the aforementioned composition and its stable aqueous emulsions which have improved properties and are operative to impart same to fabrics treated therewith.

It is another object of the present invention to avoid one or more drawbacks of the prior art.

It is yet a further object of the invention to provide a method of treating textiles consisting of or containing cellulosic fabrics, which textiles will thereafter have a good finished effect and a diminished or negligible tendency to become soiled or retain soils after having been washed.

Other objects and advantages will appear as the description proceeds.

Broadly speaking the instant invention includes the provisions of a terpolymer and its resultant latex prepared by emulsion polymerization in an aqueous medium, and having the terpolymer structure having the following repeating units:

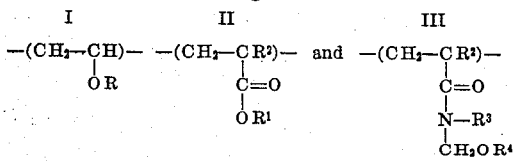

wherein R and $R^1$ are $C_1$-$C_{18}$ alkyl, $R^2$ is hydrogen or methyl, $R^3$ is hydrogen, $C_{1\text{-}18}$ alkyl, arylalkyl, or aryl and $R^4$ is hydrogen, $C_{1\text{-}18}$ alkyl or cycloalkyl and wherein said structure contains approximately by weight 10 to 25 parts of unit I, 85 to 75 parts of unit II and 2 to 7 parts of unit III.

The novel copolymer latices of the instant invention are useful as softening agents in permanent press textile applications where they offer a pleasing "hand" to the treated fabric, as self-crosslinkable adhesives, pigment binders and like uses. Moreover, fabrics treated with the latices of the instant invention are able to retain their pleasing "hand" even after dry cleaning due to the substantially permanent incorporation of the latice onto the fabric and into the permanent press resin itself, probably through cross-linking of the N-alkylol groups with the hydroxyl groups of the fabric and said permanent press resin.

In addition, these active "self-crosslinking" latices may also be used as textile adhesives for the purpose of laminating fabrics, flocking and imparting fabric dimensional stability, etc.

As examples of "ethers" which may be employed there may be mentioned those in which the alkyl (straight-chain or branched) group is from one to eight carbon atoms such as, for example, vinyl methyl ether, vinyl ethyl ether, vinyl propyl ether, vinyl isopropyl ether, vinyl n-butyl ether, vinyl isobutyl ether, vinyl n-butyl ether, vinyl isobutyl ether, vinyl n-amyl ether, vinyl n-hexyl ether, vinyl n-heptyl ether, vinyl octyl ether, isopropenyl dodecyl ether, 1-eicosenyl decyl ether, vinyl p-octylphenyl ether, 1-decenyl-p-cetylphenyl ether, 1-decenyl-p-phenyl butyl ether and the like and mixtures thereof.

The term "N-alkylol acrylamide" is meant to include the products which can be obtained, for example, by reacting acrylamide or its homologs with aldehydes; for example, by reacting an acrylamide or methacrylamide with formaldehyde or a suitable alternative. There may also be used copolymers of etherified N-alkylol amides formed from reacting N-alkylol derivatives of acrylic or methacrylic acid aamides and the like and monohydric saturated aliphatic alcohols. These N-alkylol acrylamides may have the general formula

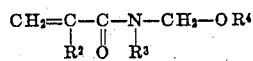

in which $R^2$ is hydrogen or methyl; $R^3$ is hydrogen, $C_{1\text{-}18}$ alkyl, arylalkyl and aryl; $R^4$ is hydrogen, $C_{1\text{-}18}$ alkyl or cycloalkyl, such as, for example, methyl, ethyl, n-propyl, isopropyl, n-butyl, isobutyl and cyclohexyl.

Further examples of N-alkylol amides of olefinically unsaturated carboxylic acids having 4-10 carbon atoms are N-methylol acrylamide, N-ethanol acrylamide, N-propanol acrylamide, N-methylol methacrylamide, N-ethanol methacrylamide, N-methylol maleimide, N-methylol maleamide, N-methylol maleamide acid, N-methylol maleamide acid esters, N-alkylol amides of the vinyl aromatic acids such as N-methylol-p-vinyl benzamide and the like. The preferred monomers are the N-alkylol amide type because of their availability and relatively low cost, preferably the N-alkylol amides of alpha-beta-mono-olefinically unsaturated monocarboxylic acids and optimally, N-methylol acrylamide and N-methylol methacrylamide.

The term "acrylate" is meant to include typically, glycol diacrylates and glycol dimethacrylates, as for example, ethylene glycol diacrylate and butanediol dimethacrylates; esters of ethylenically unsaturated polymerizable carboxylic acids and polyhydric alcohols, such as glycerol triacrylates; vinyl esters and allyl esters of ethylenically unsaturated polymerizable carboxylic acids, such as vinyl methacrylate and aryl acrylate; and the like. Esters of acrylic acid and methacrylic acid are preferred as the further polymerizable compounds, for example the methyl, ethyl, propyl and butyl esters and the like and mixtures of these esters.

The free radical-supplying polymerization initiators useful in the present invention are well-known in the art. Most of these catalysts are represented by the inorganic or organic peroxygen or peroxide compounds which yield free radicals under the conditions of polymerization however, they need not be. As an example of such organic peroxygen compounds there may be mentioned the peroxygen derivatives containing the grouping —O—O, for example; 2,4-dichlorobenzoyl peroxide; 4-chlorobenzoyl peroxide; t-butyl peroxypivalate, lauroyl peroxide, succinic acid peroxide; 2,5-dimethyl-2,5-bis(2-ethylhexanoly peroxy)-hexane; benzoyl peroxide; 4-methoxybenzoyl peroxide; α-naphtoyl peroxide; β-naphtoyl peroxide; phthaloyl peroxide; propionyl peroxide; α-methylbutyryl peroxide; di-t-butylperoxy oxalate; t-butylperoxy maleic acid; di-t-butylperoxy maleate; t-butyl peroctoate; t-butyl peroxyisobutyrate; 2,5-dimethyl-2,5-bis(benzoyl-peroxy)hexane; t-butyl peracetate; t-butyl perbenzoate; acetyl peroxide; di-t-butyl diperphthalate; di(isopropylperoxy)carbonate; 2,5-dimethyl-2,5-di(isopropoxycarbonylperoxy)hexane; 2,5-dimethyl-2,5-di-(isopropoxycarbonylperoxy)hexane; t-butyl-N-(phenylperoxy)carbamate; 1,1-bis(t-butyl-peroxy)-3,3,5-trimethylcyclohexane; n-butyl-4,4-bis(t-butylperoxy)valevate; dicumyl peroxide; 2,5-dimethyl-2,5-di(t-butylperoxy)hexane; 2,5-dimethyl-2,5-di(t-butylperoxy)-hexane; di-t-butylperoxide; di-t-amyl peroxide; isobutyl-t-butyl peroxide; t-butyl hydroperoxide; cumyl hydroperoxide; pinane hydroperoxide; cyclohexyl hydroperoxide; tetralin hydroperoxide; ascarodole peroxide; methyl ethyl ketone peroxide; apocamphyl peroxide; triptoyl peroxide; polymeric peroxides such as polystyrene peroxide, the like and mixtures of the foregoing.

Azo type initiators, i.e., compounds containing the azo linkage, may be employed. As examples of such catalysts there may be mentioned α–α' - azo bis (α – γ dimethyl valeronitrile); α–α' - azo bis (α-methyl butyronitrile); α–α' - azo bis (α-methyl butyronitrile); α–α' - azo bis (α-ethyl butyronitrile); α–α' - azo diisobutramide; dimethyl and diethyl α–α' - azo diisobutyrate and the like.

Particularly preferred as the catalyst effective for the production of optimum results with respect to a minimum of homopolymer and maximum emulsion stability and film clarity are the water-soluble inorganic peroxygen compounds such as sodium, potassium, and ammonium persulfates, perphosphates, and perborates, and hydrogen peroxide, which may be employed along with an activator and the like.

Some typical activators are amines, meta-bisulfites, ascorbic acid and erythorbic acid. Preferred are the water-soluble oxidation-reduction or "redox" type catalysts, heavy metal activators and the water-soluble peroxygens. Included in this preferred list are the water-soluble persulfates; the combination of one of the water-soluble peroxygen compounds such as potassium persulfate with a reducing substance such as a polyhydroxyphenol, an oxidizable sulfur compound such as sodium bisulfite, sodium sulfite and the like; the combination of a water-soluble peroxygen compound such as a potassium persulfate and dimethylol propionitrile; the combination of a water-soluble peroxygen compound with a reducing sugar or with a combination of a diazo mercapto compound and a water-soluble cerecyanide compound and others. Heavy metal ions which greatly activate potassium persulfate catalyzed and redox catalyzed polymerizations include those of silver, cupric copper, iron, cobalt, nickel and others. The amount of catalyst required for the system is about .01 to about 2.5 weight percent based upon the weight of the mixture of monomers.

Anionic, nonionic or cationic emulsifying agents may be employed although nonionic agents are preferred. As examples of nonionic agents which may be employed, there may be mentioned the condensation products of a plurality of moles of ethylene oxide with organic compounds containing at least eight carbon atoms and a reactive hydrogen atom such as the water insoluble carboxylic and sulfonic acids, alcohols, thiols, phenols, hydroxy carboxylic acids, carboxy and sulfonic acid amides, primary and secondary amines, hydroxyalkylamines, as disclosed, for example, in U.S. Pat. Nos. 1,970,578, 2,205,021, 2,085,706, 2,002,613, 2,266,141, 2,677,700, 2,213,477, 2,593,112, 2,454,434, 2,454,542–545 and 2,174,761. As specific examples of such nonionic agents there may be mentioned the reaction products of 1 mole of nonylphenol with 9 to 100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O., 1 mole of soybean oil amine with 10 E.O., 1 mole of rosin amine with 32 E.O., 1 mole of cocoanut fatty acid amine with 7 E.O., 1 mole of dinonyl phenol with 15 E.O., 1 mole of oxo tridecyl alcohol with 12 E.O., Pluronic L62 and the like. The amount of surfactant used should preferably be in the range of about 1 to about 10 percent by weight, based on the mixture of monomers.

Suitable anionic surface active agents may also be used, in like amounts, such as sulfonic acids, sulfate esters, and phosphate esters (particularly the primary and secondary phosphate esters and mixtures thereof) of the above mentioned nonionic surface active agents as disclosed, for example, in U.S. Pat. Nos. 3,004,056 and 3,004,057. Other such anionic surface active agents include alkylaryl sulfonic acids such as dodecylbenzene sulfonic acid, alkyl sulfates such as sodium M-methyl taurides of higher ($C_{10}$ to $C_{20}$) fatty acids as disclosed, for example, in U.S. Pat. Nos. 1,932,180, 3,013,035, 3,013,036, and 3,057,889, isethionates such as sodium N-methyl isethionate esters of higher ($C_{10}$ to $C_{20}$) fatty acids, as disclosed, for example, in U.S. Pat. Nos. 2,923,724 and 3,004,049. There may also be employed mixtures thereof and a combination of phosphate esters with a nonionic agent such as those aforesaid, in the following ranges, 50–90:50:10, preferably 75:25.

It is believed that the function of the vinyl ether moiety in these terpolymer latices is to internally plasticize the acrylate moieties, thereby creating a softening action toward the permanent press resin (normally hard and brittle) to a definitely greater degree than can be obtained with heretofore used acrylate/N-methylol acrylamide polymer latices.

In order to prepare stable permanent press compositions from the aforementioned monomers, the latices should meet the following two requirements:

a. they should not coagulate or flocculate up to a temperature of about 140°F (normal maximum temperatures of latex application to fabrics); and b. they should not flocculate or coagulate up to 140°F in the presence of permanent press chemicals such as methylol aided urea derivatives, catalysts for cross-linking such as zinc nitrate, softeners such as polyethylene latices, long chain quaternary amines and the like.

DETAILED DESCRIPTION

In carrying out the polymerization reaction, the catalyst and non-aqueous mixture of monomers may, in general, be admixed with an aqueous solution of surfactant, initiator, and activator. The monomers may all be added initially, or separately, or all of such monomers may be added gradually, or in increments to the aqueous solution. The non-aqueous monomer mixture, preferably containing the catalyst, should preferably be added in increments to the polymerization vessel already containing a hot aqueous solution of some of the surfactant catalyst, and some of the monomers.

After the above steps have been completed, the reaction is commenced and should be carried out at a temperature range of about 0° to 150°C, the preferred range being about 0° to 100°C. The pH of the medium during polymerization is substantially non-critical, though a pH of above 7, preferably about 7 to 9, and optimally about 8 should be employed in order to prevent coagulation or hydrolysis or self-condensation of the monomers. The polymer latex may subsequently be adjusted to any desired pH. The maintenance of the reaction mixture on the alkaline side of the pH range is especially preferred so as to prevent any appreciable loss of vinyl ether by hydrolysis. Buffers such as sodium carbonate, phosphate and the like may be used. Completion of the reaction may be determined by cessation of heat and/or analysis of solids content and the like. A solids content of about 50 to 60 percent is preferred though further concentration is permissible.

While the polymerization may be carried out in the presence of air, the rate of reaction is ordinarily faster in the absence of oxygen and hence polymerization in an evacuated vessel, at reflux, or under an inert atmosphere such as nitrogen or the like is preferred. Other polymerization techniques and practices employed in the preparation of acrylic polymers may also be used in polymerizing the monomer mixture herein described. For example, the use of mercaptan modifiers, such as the primary secondary, and tertiary aliphatic mercaptans containing from 4-16 carbon atoms is sometimes desirable in the reaction mixture and results generally in a lower raw polymer viscosity and other allied plastic properties. Still other substances which may be incorporated into the reaction medium include electrolyte salts, carbon black, silica and the like, in a manner well understood in the art. Moreover, the polymerization may be terminated, as by addition of a polymerization inhibitor such as hydroquinone, phenyl beta-naphthalene or the like, before conversion of the monomers to polymer is complete.

A preferred terpolymer structure in accordance with the instant invention is one having the following repeating units:

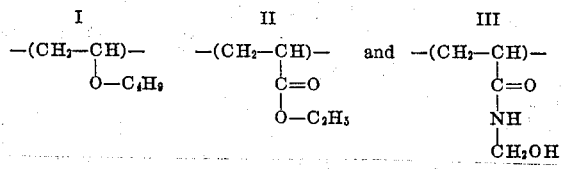

and wherein the structure contains approximately by weight 10–25 parts unit I, 85–75 parts unit II and 2–7 parts unit III. In particular, the amount of unit III needed will depend on the latex and use and the like; if tight crosslinking is desired more than about 5 wt. percent N-alkylol amide should be used, but in most cases about 1 to about 5 percent is sufficient, amounts greater than about 5–10 percent will generally increase the cost of the polymer. Where substantivity to the fabric is preferred, about 3 percent is sufficient, while where a more rigid adhesive is required about 5 wt. percent suffices.

The polymers of this invention may be isolated from the latex by conventional means, by coagulation with conventional alcohol or salt-acid coagulants or by freeze agglomeration. In general, the latex form of the polymer is most useful in coating, impregnating, dipping operations and the like. The latex may be used, per se, it may be diluted to lower its solids content or in may be blended with other dispersions or latices of other rubbery or plastic materials and the like. It is often desirable to blend thickeners and bodying agents with the latex for improvement of flow properties and for subsequent coating by dipping operations. Well-known thickening agents and stabilizers such as casein, gelatin, carboxy-methyl-cellulose, methycellulose, ethylcellulose, polyacrylic acid, and polyvinyl alcohol may be used as well as other similar materials for the foregoing purposes.

It will be understood that known surface active agents, protective colloids, plasticizers, thickeners, chain transfer agents and/or other additives when employed may be added prior to, during or after the polymerization reaction is completed in accordance with techniques well-known in the art.

As aforesaid, in addition to the hand modification and smooth drying properties, the instance latices also impart a protective influence to the cellulosic portion of resin treated textile articles against abrasive wear. It is in this area especially, that the improvement in properties attributable to the instant terpolymer latices are evident. Improvements are evident when treated fabrics are tested under controlled conditions, i.e., two common tests for abrasion resistance are the Stoll Flex Abrasion Test (C.S.I. Universal Wear Tester) for all fabrics, and the differential abrasion for "frosting" tests (C.S.I. Universal Wear Tester) for polyester/cellulosic or other blended cross-dyed fabrics.

In the Stoll Flex Abrasion Test a strip of test fabric is mounted on the C.S.I. Universal Wear Tester and held under prescribed tension. A portion of the fabric is then moved back and forth across an abrading bar until the fabric ruptures from abrasive wear. The number of cycles necessary to cause failure is automatically recorded.

In the frosting test a cross-dyed polyester-cellulosic blend fabric is mounted on the C.S.I. Universal Wear Tester and is subjected to flat abrasive wear under a specified head weight. The test method is described by Gobeil and D'Alessandro, "American Dyestuff Reporter," Volume 54, No. 24 (Nov. 22, 1965). When such fabrics are subjected to flat abrasive wear, the cellulosic yarns preferentially wear away leaving the polyester yarns which may be dyed in a contrasting color which results are apparent by the abraded area.

It will be apparent to those skilled in the art that the novel invention disclosed and claimed herein, in connection with the specific exemplifications thereof, will suggest to those skilled in the art other modifications and applications of the same.

The following examples, which are not to be considered as limiting, illustrate the invention. As exemplified herein and in the appended claims, all parts and proportions are by weight unless otherwise indicated.

EXAMPLE 1

This example illustrates the preparation of an isobutyl vinyl ether/n-butyl acrylate/N-methylol acrylamide terpolymer latex (ratios 19/78/3) which is suited as a durable press additive.

To a 3-liter round bottomed flask equipped with paddle stirrer, thermometer, reflux condenser and additional funnel there is added:

50.0 g. distilled water,
4.0 g. nonyl phenol ethylene oxide and
0.2 g. sodium persulfate.

This is heated to 70°C and the following aqueous monomer emulsion is added in 10 increments over one hour keeping the temperature at 80°–90°C.

300.0 g. H$_2$O,
12.8 g. of a phosphate ester of nonyl phenol ethoxylate,
1.4 g. sodium persulfate (Na$_2$S$_2$O),
1.6 g. disodium-hydrogenphosphate (Na$_2$PHO$_4$), a few drops of NaOH (50%) to raise the pH to 8.5,
280.0 g. n-butyl acrylate (5 ppm. MeHQ)
70.0 g. isobutyl vinyl ether, and
17.5 g. N-methylol acrylamide (60 percent aqueous solution).

At the end of the above time there is formed a fine grained terpolymer latex containing 51 percent total solids, and having a pH of 5.4. This latex is moderately viscous (2,000 cps.), and a theoretical solids content of 51.2 percent.

EXAMPLE 2

The preparation of terpolymer latices by the redox technique is illustrated as follows:

To a 1-liter bottomed flask there is charged 376.0 g. distilled water,
24.0 g. Triton X-200 (Rohm & Haas, nonionic surfactant),
40.0 g. isobutyl vinyl ether, 160.0 g. n-butyl acrylate,
10.0 g. N-methylol acrylamide (60 percent aqueous solution),
4.0 ml. FeSO$_4$·7H$_2$O solution (0.3 g./200 cc. H$_2$O),
1.0 g. Na$_2$S$_2$O$_8$ and
1.0 g. Na$_2$HPO$_4$ This is cooled with stirring to 20°C and
1.0 g. sodium meta-bisulfate and
5.0 drops t.-butylhydroperoxide are added. The temperature then rises to 63°C in 2 minutes as polymerization takes place, at which time there are 32.8 percent solids formed. After two hours 33.0 percent solids are present and the pH is 4.2. Theoretical solids content is 34.0 percent. This latex is very fluid and of quite small particle size. The copolymer has a relative viscosity of 2.15 when measured in glacial acetic acid at 1.0 w/v percent concentration. This latex deposits clear tacky films which adhere well to many different substrates.

EXAMPLE 3

This example illustrates the preparation of an isobutyl vinyl ether/ethyl acrylate/N-methylol acrylamide terpolymer latex (ratio 13/83/2).

The procedure of Example 1 is repeated except that the monomers composition is as follows: ethyl acrylate (305 g.), isobutyl vinyl ether (47 g.) and N-methylol acrylamide (12.0 g. 60 percent aqueous solution).

The latex contains 51.0 percent solids and pH of 6.2. Clear films of a less tacky nature than Example 1's product are deposited. This material is useful in the durable press formulation to yield a somewhat harder hand to the fabrics than the product of Example 1.

EXAMPLE 4

This example illustrates the preparation of an ethyl vinyl ether/2-ethylhexyl acrylate/N-methylol acrylamide terpolymer latex at a monomer composition of 10/88/2. The procedure of Example 2 is repeated except that the above monomers at the above ratios are used. A blue-fine grained latex of 34 percent solids, pH 5.0 is obtained. This deposits very tacky films of excellent clarity which are easily cured at 85°C to yield crosslinked films of tenacious adherance and resistance to solvents.

EXAMPLE 5

This example illustrates the preparation of an ethyl vinyl ether/ethyl acrylate/N-methyol acrylamide terpolymer latex from a 10/83/7 monomer feed.

The procedure of Example 2 is followed using the above monomer feed. In this case a latex (34 percent solids, pH 5.2) is obtained which deposits clear, relatively non-tacky films of excellent adhesion to glass, aluminum, paper, etc., but which on curing at 85°C gives very rigid coatings of high adhesion and flexural strength.

TABLE "A"

| | |
|---|---|
| IPA | Abbreviation for isopropyl alcohol. |
| IBVE | Abbreviation for isobutyl vinyl ether. |
| nBA | Abbreviation for n-butyl acrylate. |
| NMA | Abbreviation for N-methylol acrylamide. |
| Monsanto W/R | A crease or wrinkle recovery test developed by Monsanto Chemical Company. Test is now AATCC TTM 66–1959 T. |
| Stoll Flex 1 & | The number of flex abrasion cycles |

TABLE "A"—Continued

| | |
|---|---|
| 4 lbs. Cycles | required to rupture a fabric sample held under 4 lbs. tension when mounted on the C.S.I. Universal Wear Tester. |
| Frosting Rating | A rating to indicate the shade contrast in a circular area of cross-dyed polyester/cellulosic fabric subjected to flat abrasion on the C.S.I. Universal Wear Tester employing 2.5 lbs. head wt. for 1200 cycles. The following rating system was used to indicate contrast.<br>5 = negligible (best)<br>4 = slight<br>3 = noticeable<br>2 = considerable<br>1 = much or severe |

EXAMPLE 1

Cellulosic fabrics are padded at 100°F with indicated aqueous formulations, dried and then cured at 325°F for 12 minutes. Fabric samples are then tested for Stoll Flex abrasion resistance and Monsanto crease recovery properties. All polymer emulsions are evaluated on an equal solids basis.

TABLE I

| % O.W.B. | Sample No. 1 | Sample No. 2 | Sample No. 3 | Sample No. 4 |
|---|---|---|---|---|
| A dimethylol dihydroxy-ethylene urea resin solution | 25. | 25. | 25. | 25. |
| A zinc nitrate based catalyst solution | 4.5 | 4.5 | 4.5 | 4.5 |
| Isopropyl alcohol | 0.25 | 0.25 | 0.25 | 0.25 |
| An aqueous polyethylene emulsion | — | 2 | 2 | 2 |
| IBVE/nBA/nMA 20-80-3 | — | 6 | — | — |
| A reactive latex of ethyl acrylate/N-methylol acrylamide copolymer | | | 4.2 | 4.2 |

| Cycles | 100% Rayon Twill Stoll Flex ½ & 2 pounds | | Monsanto W/R W&F | 100% Cotton Twill Stoll Flex 1 & 4 lbs. Cycles | | Monsanto W/R W&F |
|---|---|---|---|---|---|---|
| | W | F | | W | F | |
| 1) | 46 | 68 | 306 | 90 | 312 | 293 |
| 2) | 343 | 146 | 308 | 407 | 1010 | 315 |
| 3) | 236 | 127 | 304 | 179 | 753 | 309 |
| 4) | 333 | 152 | 307 | 425 | 1120 | 317 |

EXAMPLE 2

Fabric samples of Testfabrics No. 9503 Dacron/cotton are padded at 90°–100°F with aqueous solutions of the indicated composition, dried and cured at 325°F for 12 minutes. Fabrics are tested for flat abrasion (frosting) resistance. All polymers are evaluated on an equal solids basis.

TABLE B

All solutions contain 20 percent of said urea resin solution owb, 4 percent catalyst owb (of Table I), 0.25 percent Isopropyl Alcohol owb, and

| Sample Number | nBA/IBVE/nMA 80-20-3 | nBA/nMA 97-3 | Ethyl Acrylate/N-methylol acrylamide copolymer reactive latex | Aqueous polyethylene emulsion |
|---|---|---|---|---|
| 1 | — | — | — | — |
| 2 | 3.5 | — | — | 1 |
| 3 | — | 4 | — | 1 |
| 4 | — | — | 3.5 | 1 |

| Sample Number | Frosting Rating on D/C 50/50 Cross-Dyed |
|---|---|
| 1 | 1— |
| 2 | 4— |
| 3 | 2+ |
| 4 | 2+ |

EXAMPLE 3

Swatches of three fabrics differing in construction and fiber composition are padded at 90°–100°F with aqueous solution of indicated composition, dried and cured at 325°F for 12 minutes. Wet pickups are determined in each case and are as follows:

| 65/35 | Dacron/cotton | approximately 90% |
| 50/50 | Dacron/cotton | approximately 80% |
| 65/35 | Fortrel/Avril (F/A) | approximately 90% |

Fabrics are then tested for flat abrasion (frosting) resistance. All polymers are evaluated on an equal solids basis.

TABLE C

All solutions contain 20 percent of the urea resin solution owb, 4 percent of said catalyst owb, 0.25 percent of said Isopropyl Alcohol owb, and

| Sample Number | Aqueous polyethylene Emulsion | (IBVE/nBA/nMA) 20/83/3 | (IBVE/nBA/nMA) 5/95/3 |
|---|---|---|---|
| 1 | — | — | — |
| 2 | 2 | 6.5 | — |
| 3 | 2 | — | 5.8 |

FROSTING-RATING

| Sample Number | 50/50 D/C Test 1 | 50/50 D/C Test 2 | 65/35 D/C Test 1 | 65/35 D/C Test 2 | 65/35 F/A Test 1 | 65/35 F/A Test 2 |
|---|---|---|---|---|---|---|
| 1 | 1— | 1— | 1 | 2— | 1— | 1— |
| 2 | 3+ | 4— | 5— | 5— | 3 | 3 |
| 3 | 3+ | 4— | 4 | 4+ | 2+ | 3— |

EXAMPLE 4

Tests are conducted as in Example 3 on 65/35 Fortrel/Avril. All polymers are evaluated on an equal solids basis.

TABLE D

All solutions contain 20 percent of said urea resin solution owb, 4 percent of said catalyst owb, 0.25 percent of said Isopropyl Alcohol owb, 1 percent of said aqueous polyethylene emulsion owb, and

| Sample Number | nBA/IBVE/nMA 80-20-3 | nBA/nMA 97-3 | Exp. 5566-259 nBA | Ethyl acrylate N-methylol acrylamide copolymer |
|---|---|---|---|---|
| 1 | 3 | — | — | — |
| 2 | — | 3 | — | — |
| 3 | — | — | 3 | — |
| 4 | — | — | — | 2.65 |

| Sample Number | Frosting Rating Fortrel/Avril 65/35 |
|---|---|
| 1 | 3— |
| 2 | 2+ |
| 3 | 2+ |
| 4 | 2— |

EXAMPLE 5

This example illustrates the negligible effect which an IBVE/butyl acrylate/N-methylol acrylamide emulsion polymer has on the soil-release properties of a commercial soil-release acrylic latex, i.e., an ethyl acrylate/N-methylol acrylamide copolymer.

Swatches of 50/50 Dacron/cotton and 65/35 Dacron/cotton fabrics are padded with aqueous solutions containing the following compositions:

25 percent of a solution of modified dihydroxy dimethylol ethylene urea;
4 percent catalyst MI (Magnesium Chloride Solution);
3 percent Polymer Emulsion *;
20 percent of a solution of soil-release agent;
1 percent of a solution of alkyl aryl sulfonate;
47 percent water.

*On the "A" samples the polymer emulsion is a reactive acrylic latex on ethyl acrylate/N-methylol acrylamide copolymer and on the "B" samples the polymer emulsion is the IBVE/BuA.NMA and on the "C" samples, water is substituted for the polymer emulsion as a control.

All swatches are dried and then heat cured at 340°F for 2½ minutes.

All swatches are then spotted with mineral oil, lipstick, Russian dressing, used crank case oil, mustard and Wesson oil. Stains are allowed to dry and then the swatches were placed in a home-type agitator washer and washed with "Tide" at 140°F. After rinsing and drying the samples are evaluated for stain removal. Each stain is rated by the following system:

5 = no or negligible stain remaining
4 = slight stain remaining
3 = noticeable stain remaining
2 = considerable stain remaining
1 = much stain remaining The following ratings are assigned to the test swatches.

| Sample | Mineral Oil | Lipstick | Russian Dressing | Crank Case Oil | Mustard | Wesson Oil |
|---|---|---|---|---|---|---|
| A | 3–4 | 3 | 3 | 3 | 3–4 | 3–4 |
| B | 4–5 | 4 | 4 | 3–4 | 3–4 | 4–5 |
| C | 4–5 | 3 | 4–5 | 3–4 | 3 | 4–5 |

Other variations and modifications of this invention will be obvious to those skilled in the art and can be made of the invention without departing from the scope and intent thereof.

Having thus described our invention, what we claim as new and desire to be secured by Letters Patent is as follows:

1. A terpolymer structure comprising the following repeating units,

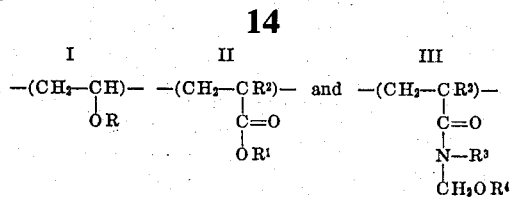

wherein R and $R^1$ are $C_1$–$C_{18}$ alkyl, $R^2$ is hydrogen or methyl, $R^3$ is hydrogen, $C_{1-18}$ alkyl, arylalkyl, or aryl and $R^4$ is hydrogen, $C_{1-18}$ alkyl or cycloalkyl and wherein said structure contains approximately by weight 10 to 25 parts of unit I, 85 to 75 parts of unit II and 2 to 7 parts of unit III.

2. A terpolymer as defined in claim 1 wherein unit I is derived from ethyl vinyl ether.

3. A terpolymer as defined in claim 1 wherein unit I is derived from isobutyl vinyl ether.

4. A terpolymer as defined in claim 1 wherein unit II is derived from n-butylacrylate.

5. A terpolymer as defined in claim 1 wherein unit II is derived from ethylarcrylate.

6. A terpolymer as defined in claim 1 wherein unit II is derived from hexyl acrylate.

7. A terpolymer as defined in claim 1 wherein unit III is derived from N-methylol acrylamide.

8. A terpolymer as defined in claim 7 wherein unit I is derived from isobutyl vinyl ether.

9. A terpolymer as defined in claim 8 wherein unit II is derived from a member of the group consisting of ethyl acrylate and n-butyl acrylate.

10. A terpolymer as defined in claim 7 wherein unit II is derived from ethyl acrylate.

* * * * *